(12) United States Patent
Vidyadhara et al.

(10) Patent No.: US 11,392,391 B2
(45) Date of Patent: Jul. 19, 2022

(54) SELECTIVELY UPDATING A BIOS IMAGE

(71) Applicant: Dell Products L.P., Round Rock, TX (US)

(72) Inventors: Sumanth Vidyadhara, Bangalore (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 16/780,346

(22) Filed: Feb. 3, 2020

(65) Prior Publication Data
US 2021/0240484 A1 Aug. 5, 2021

(51) Int. Cl.
*G06F 9/4401* (2018.01)
*G06F 8/65* (2018.01)
*G06F 21/57* (2013.01)

(52) U.S. Cl.
CPC .............. *G06F 9/441* (2013.01); *G06F 8/65* (2013.01); *G06F 9/4408* (2013.01); *G06F 21/572* (2013.01); *G06F 21/577* (2013.01)

(58) Field of Classification Search
CPC .......... G06F 9/441; G06F 9/4408; G06F 8/65; G06F 21/572; G06F 21/577
See application file for complete search history.

(56) References Cited

U.S. PATENT DOCUMENTS

| | | | | |
|---|---|---|---|---|
| 6,425,079 B1* | 7/2002 | Mahmoud | ............. | G06F 9/4411 710/62 |
| 2006/0020837 A1* | 1/2006 | Rothman | ............. | G06F 9/4416 713/310 |
| 2006/0174240 A1* | 8/2006 | Flynn | .................... | G06F 21/572 717/170 |
| 2012/0023322 A1* | 1/2012 | Landry | .................... | G06F 8/65 713/2 |
| 2013/0276128 A1* | 10/2013 | Konetski | ............... | G06F 21/572 726/26 |
| 2014/0001073 A1* | 1/2014 | Kim | ........................ | B65B 43/54 206/459.5 |
| 2016/0306616 A1* | 10/2016 | Tomppo | ................. | G06F 9/4415 |
| 2021/0146080 A1* | 5/2021 | Trull | ....................... | G06F 16/23 |

* cited by examiner

*Primary Examiner* — Jaweed A Abbaszadeh
*Assistant Examiner* — Hyun Soo Kim
(74) *Attorney, Agent, or Firm* — Kirton McConkie; Brian Tucker

(57) ABSTRACT

A BIOS image can be selectively updated. An image loader of the BIOS can be configured to detect whether a BIOS image to be loaded includes a selective update capability field, and if so, employ a value defined in the selective update capability field to determine whether an updated BIOS image exists. When an updated BIOS image exists, the image loader can load the updated BIOS image rather than the BIOS image. In this way, an individual BIOS image can be selectively updated without needing to update the entire BIOS.

20 Claims, 11 Drawing Sheets

SELECTIVELY UPDATING A BIOS IMAGE

CROSS-REFERENCE TO RELATED APPLICATIONS

N/A

BACKGROUND

BIOS firmware (BIOS) is the first software that is executed on the central processing unit (CPU) when a computing system is powered on. The primary task of the BIOS is to initialize the hardware and load the operating system (OS). The BIOS is in the form of a collection of BIOS images that typically comply with the Portable Executable/Common Object File Format (PE/COFF) specification.

FIG. 1 illustrates a generalized architecture of a computing system 100 that employs BIOS. As shown, computing system 100 includes Serial-Peripheral Interface (SPI) flash 110 and system memory 120. SPI flash 110 can represent any non-volatile RAM on or accessible to the motherboard in which BIOS 111 is stored. When computing system 100 is powered on, the CPU will be caused to access SPI flash 110 to retrieve and load BIOS 111 into system memory 120. For simplicity, system memory 120 can be viewed as any address space accessible to the CPU and need not necessarily be computing system 100's RAM.

FIG. 1 represents that BIOS 111 is made up of a collection of BIOS images 111-1 through 111-n. These BIOS images implement the functionality for initializing computing system 100's hardware and ultimately loading the operating system. Of primary relevance to the present invention, one or more of these BIOS images will implement functionality for loading other BIOS images. For example, BIOS image 111-1 may represent the portion of BIOS 111 that implements the Unified Extensible Firmware Interface (UEFI) LoadImage( ) boot service that a UEFI boot manager can call to load other BIOS images into system memory 120. If BIOS 111 is configured to perform Secure Boot, when the LoadImage( ) boot service is called, the BIOS image to be loaded will be verified by determining whether the BIOS image has been signed with a private key that has a corresponding public key stored in an authorized database on computing system 100. If the BIOS image is properly signed, the call to the LoadImage( ) boot service will result in the BIOS image being loaded into system memory 120 so that it may be executed. Typically, a UEFI boot manager will load the BIOS images in a defined sequence and/or at a specified phase of the boot process.

Although these BIOS images are separate, it is not possible to update an individual BIOS image on SPI flash 110. To the contrary, if there is an update to any of BIOS images 111-1 through 111-n, the only way to install the update is to update the entire BIOS 111. In other words, it is not possible to add an updated BIOS image to SPI flash 110 without overwriting the entire existing BIOS 111 with a new BIOS 111 that includes the updated BIOS image.

This inability to update a single BIOS image creates a number of difficulties. For example, updating the entire BIOS can be time consuming. Therefore, a user may be reluctant to install a BIOS update. This is particularly true given that BIOS updates oftentimes only provide an update to a single BIOS image that the user may view as unimportant (e.g., an update pertaining to a peripheral interface or remote management functionality). Yet, the failure to update the BIOS may create incompatibilities, vulnerabilities or other negative side effects.

BRIEF SUMMARY

The present invention extends to methods, systems, and computer program products for selectively updating a BIOS image. An image loader of the BIOS can be configured to detect whether a BIOS image to be loaded includes a selective update capability field, and if so, employ a value defined in the selective update capability field to determine whether an updated BIOS image exists. When an updated BIOS image exists, the image loader can load the updated BIOS image rather than the BIOS image. In this way, an individual BIOS image can be selectively updated without needing to update the entire BIOS.

In some embodiments, the present invention is implemented as a method, performed during a boot process on a computing system, for selectively updating a BIOS image. In response to a request to load a BIOS image from existing BIOS, an identifier can be obtained from the BIOS image. The identifier can then be employed to determine whether an updated BIOS image is available for the BIOS image. Upon determining that an updated BIOS image is available for the BIOS image, the updated BIOS image is loaded rather than the BIOS image.

In some embodiments, the present invention is implemented as computer storage media storing computer executable instructions which when executed implement a method for selectively updating a BIOS image during a boot process on a computing system. This method may include: in response to a request to load a BIOS image from existing BIOS, determining that the BIOS image includes a selective update capability field; employing an identifier defined in the selective update capability field to determine whether an updated BIOS image is available for the BIOS image; and upon determining that an updated BIOS image is available for the BIOS image, loading the updated BIOS image rather than the BIOS image.

In some embodiments, the present invention is implemented as a computing system that includes one or more processors and computer storage media that stores existing BIOS. The existing BIOS implements an image loader and includes a plurality of BIOS images. The image loader is configured to implement a method during a boot process for selectively updating BIOS images included in the existing BIOS. In response to a request to load a first BIOS image included in the existing BIOS, the image loader determines that the first BIOS image includes a selective update capability field. The image loader then obtains a first identifier defined in the selective update capability field of the first BIOS image and determines that the first identifier is mapped to a first storage location. The image loader than loads an updated first BIOS image that is stored at the first storage location rather than loading the first BIOS image from the existing BIOS.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "computing system" should be construed as encompassing desktops, laptops, tablets, smart phones, other mobile devices or any other type of end user computing device that includes BIOS. The term "BIOS" should be construed as firmware that is executed on a computing system to initialize the computing system and load the operating system.

Figure 2A:
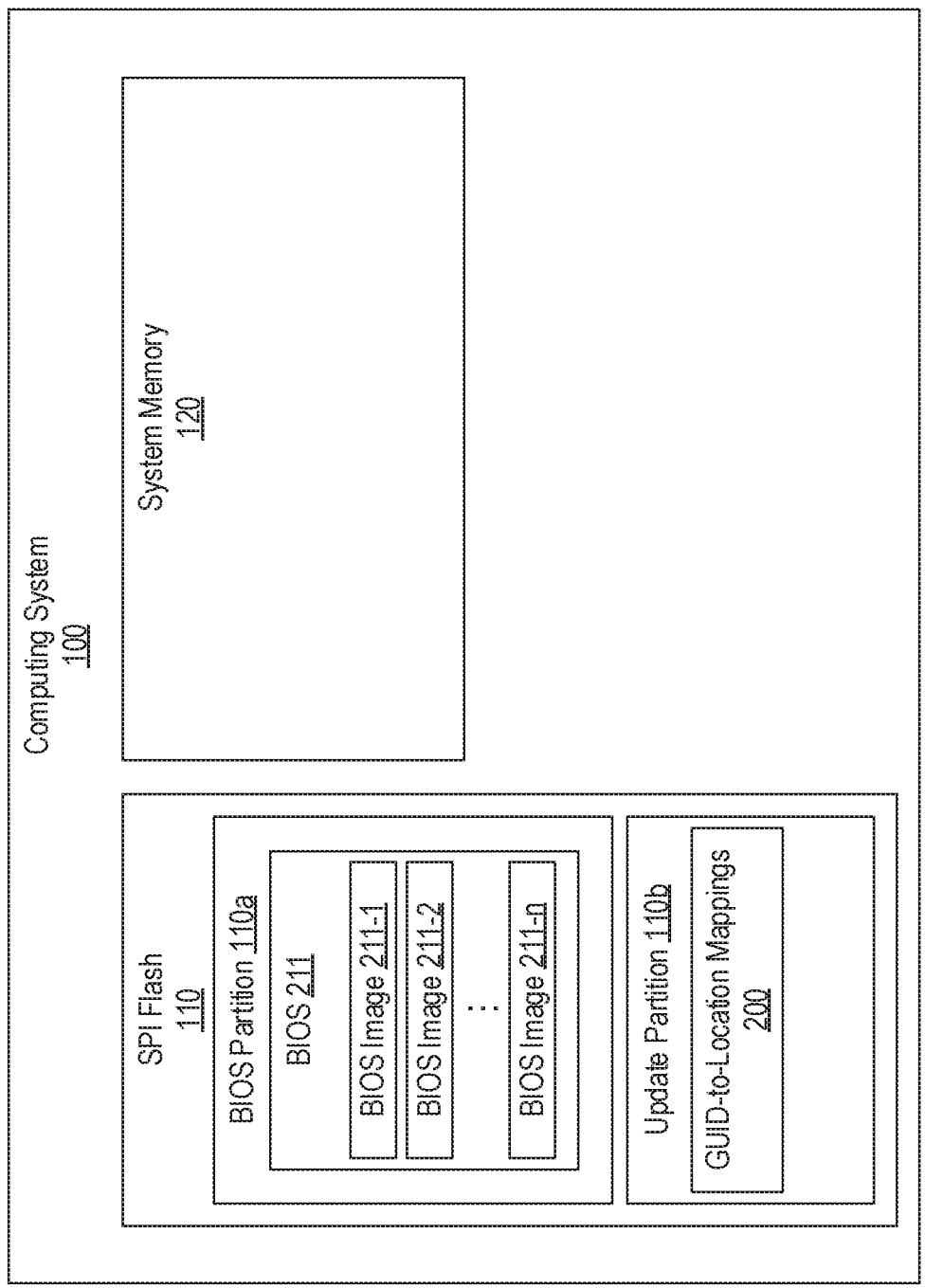
FIGS. 2A and 2B each illustrate an example architecture of a computing system that is configured in accordance with embodiments of the present invention.
Figure 2B:
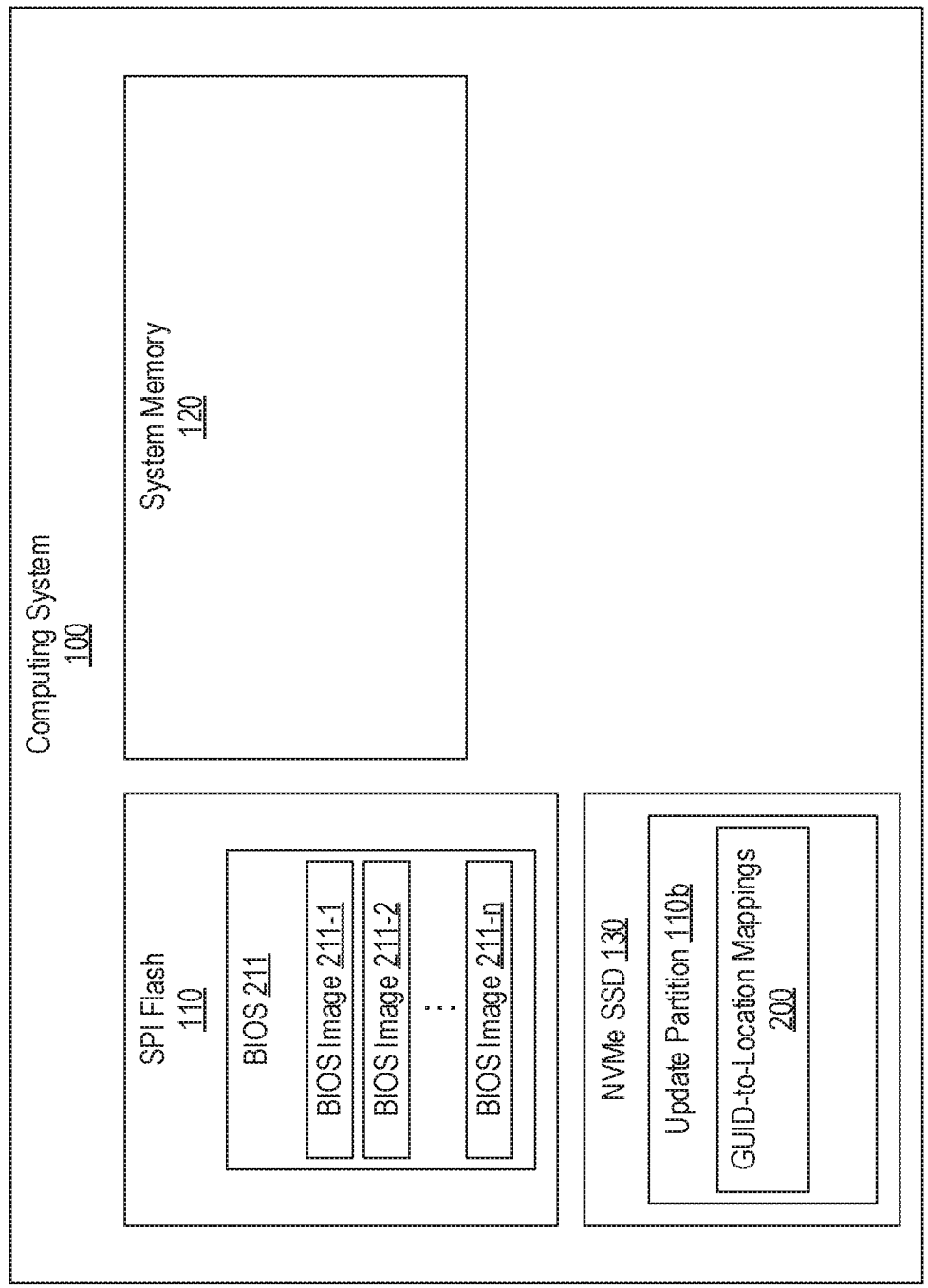

FIGS. 2A and 2B provide examples of an architecture of computing system 100 when it is configured in accordance with embodiments of the present invention. In each figure, computing system 100 includes SPI flash 110 and system memory 120 as described in the background. Additionally, in each figure, computing system 100 is shown as including an update partition 110b in which GUID-to-location mappings 200 are defined. FIG. 2A represents embodiments where SPI flash 110 includes update partition 110b as well as a BIOS partition 110a in which BIOS 211. In contrast, FIG. 2B represents embodiments where computing system 100 includes an NVMe SSD 130 on which update partition 110b is defined (e.g., in the form of an NVMe namespace). Both of these depicted embodiments should be viewed as examples only. Of importance is the fact that BIOS 211 is stored in some manner on computing system 100. The role of GUID-to-location mappings 200 will be described below, but it should be construed as any data structure suitable for this role which may be stored in any suitable storage media that is accessible on/to computing system 100 during the boot process.

Figure 1:
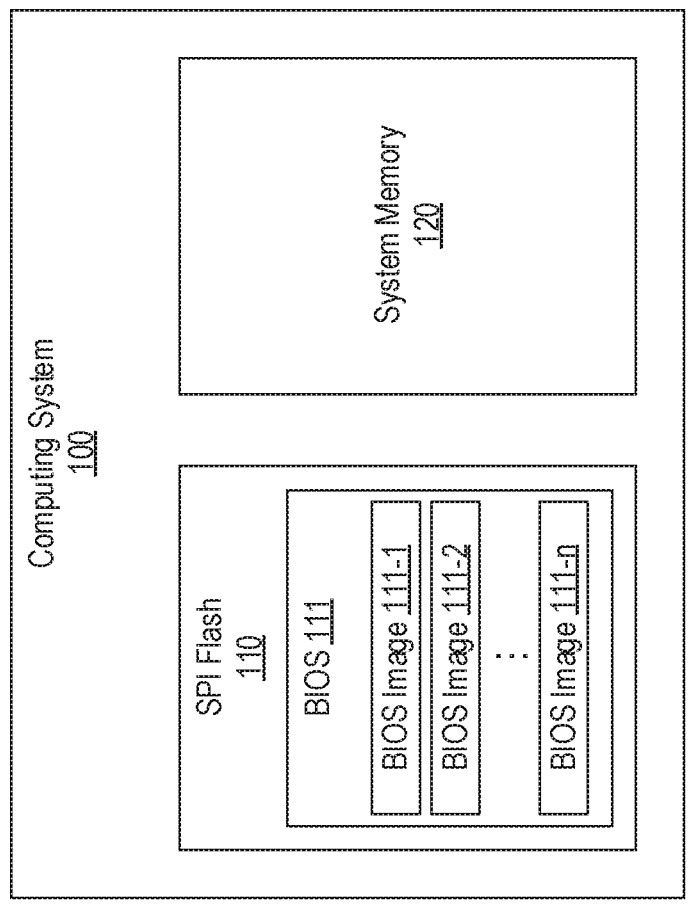
FIG. 1 illustrates an example architecture of a computing system that includes BIOS.
Figure 3:
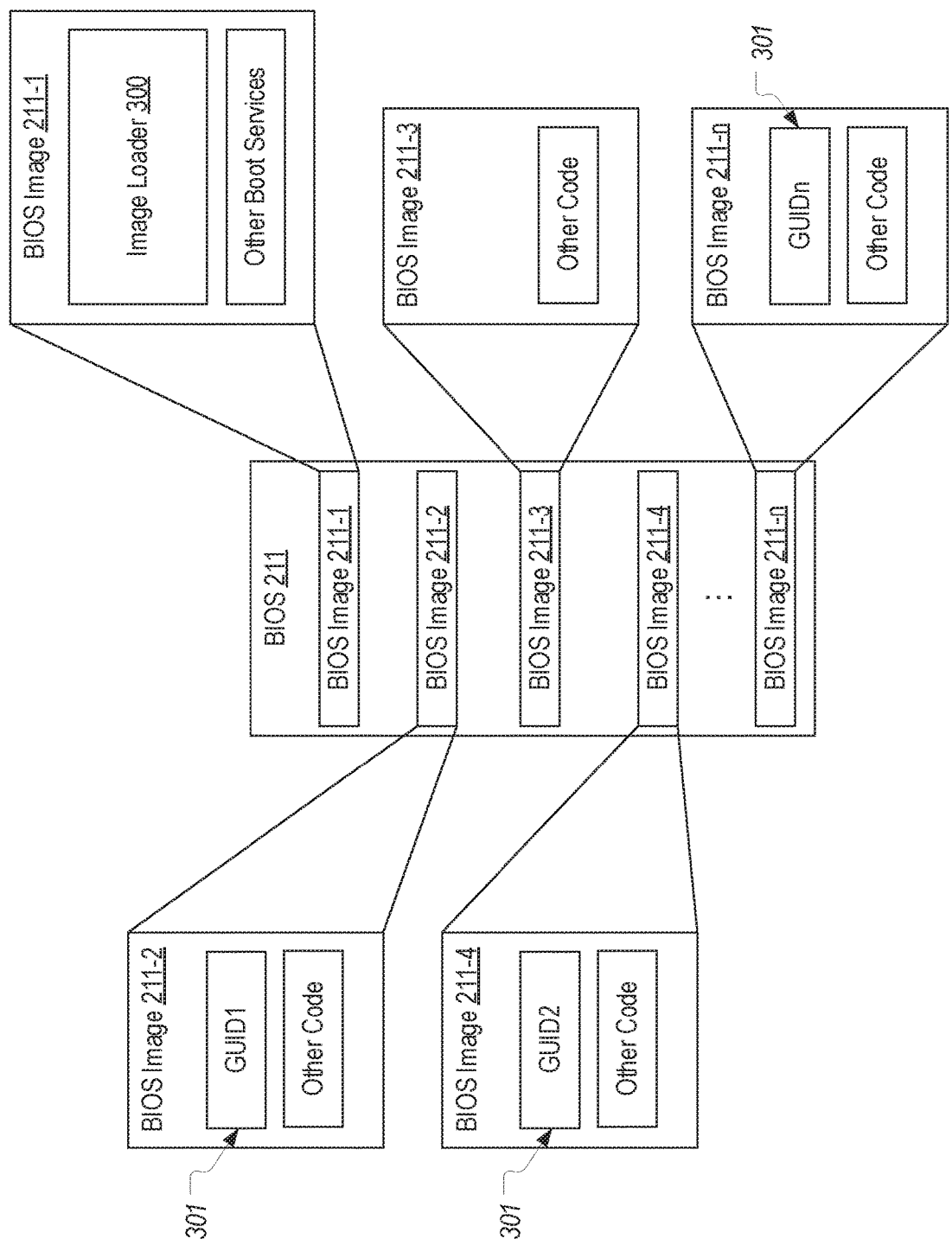
FIG. 3 provides an example of how a BIOS image can be configured to include a selective update capability field that an image loader can employ at runtime to load an updated BIOS image in place of the BIOS image.

In comparison to FIG. 1 which depicts BIOS 111, computing system 100 as depicted in FIGS. 2A and 2B includes BIOS 211. This distinction is intended to represent that at least some of BIOS images 211-1 through 211-n contained within BIOS 211 can be configured in accordance with embodiments of the present invention to enable updated BIOS images to be loaded at runtime without updating BIOS 211. FIG. 3 is intended to illustrate how BIOS images can be configured for such embodiments.

In FIG. 3, BIOS image 211-1 is assumed to be the portion of BIOS 211 that includes the functionality for loading other BIOS images. In particular, BIOS image 211-1 is assumed to implement an image loader 300 along with possibly many other boot services. In UEFI-based implementations, image loader 300 can represent the portion of BIOS 211 that implements the UEFI LoadImage( ) boot service. BIOS image 211-1 could also implement a boot manager that is configured to invoke image loader 300 to load at least some of the other BIOS images in BIOS 211. FIG. 3 also shows that BIOS images, 211-2, 211-4 and 211-n each include a selective update capability field 301 that defines a value or identifier that is unique to the BIOS image (e.g., a globally unique identifier (GUID)). FIG. 3 further shows that BIOS image 211-3 does not include a selective update capability field 301 which is intended to represent that not all BIOS images in BIOS 211 need to include selective update capability field 301. As described in greater detail below, the presence of a selective update capability field 301 within a BIOS image can represent to image loader 300 that the BIOS image is capable of being selectively updated at runtime.

In some embodiments, to create BIOS images that include a selective update capability field 301, UEFI build tools can be employed to integrate selective update capability field 301 into the PE/COFF format in which the BIOS images are defined. For example, in some embodiments, selective update capability field 301 could be in the form of a custom fixup or relocation entry as those terms are defined in the PE/COFF specification.

Figure 4A:
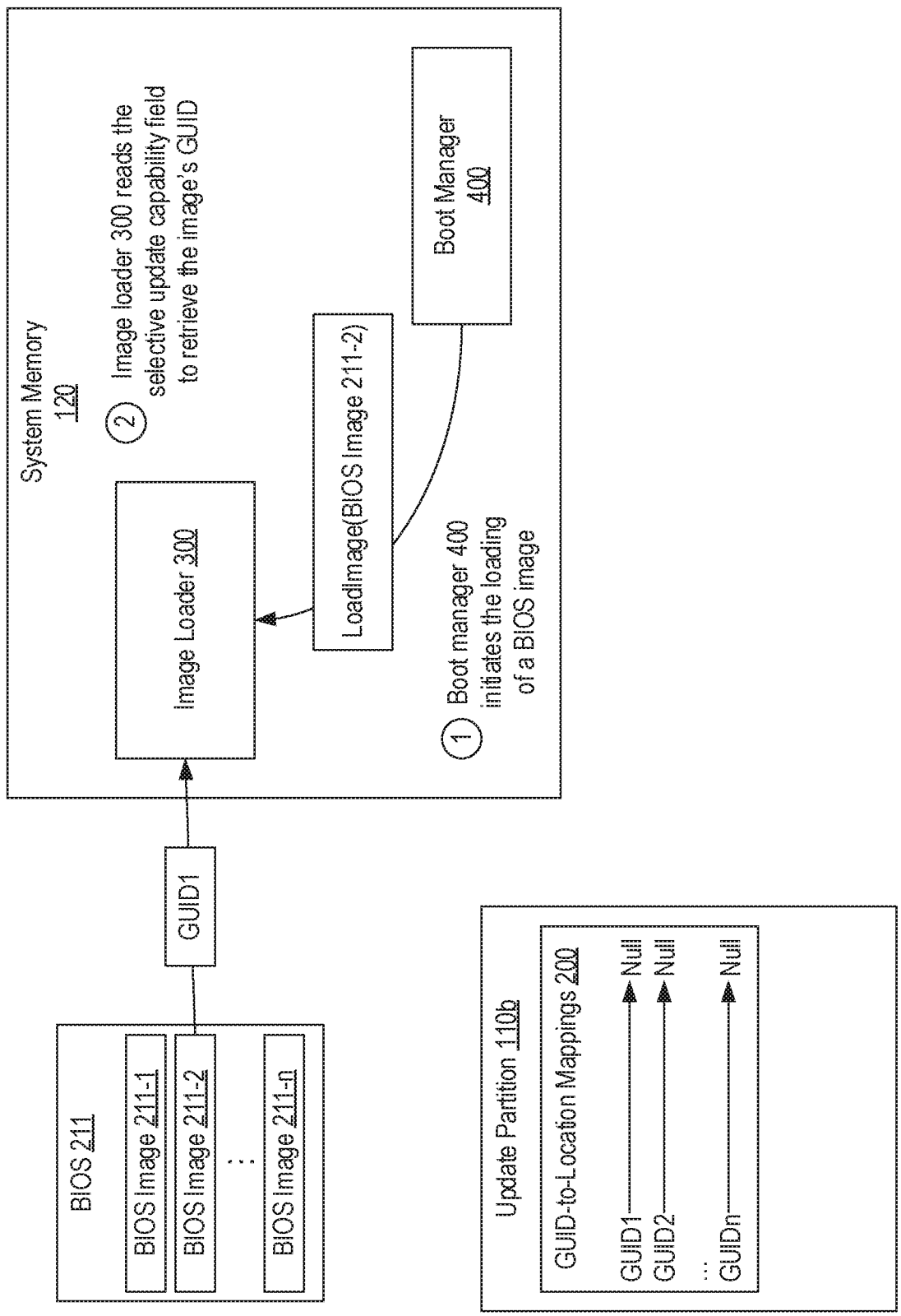
FIGS. 4A-4C provide an example of how an image loader can detect whether an updated BIOS image is available when it attempts to load a BIOS image.
Figure 4B:
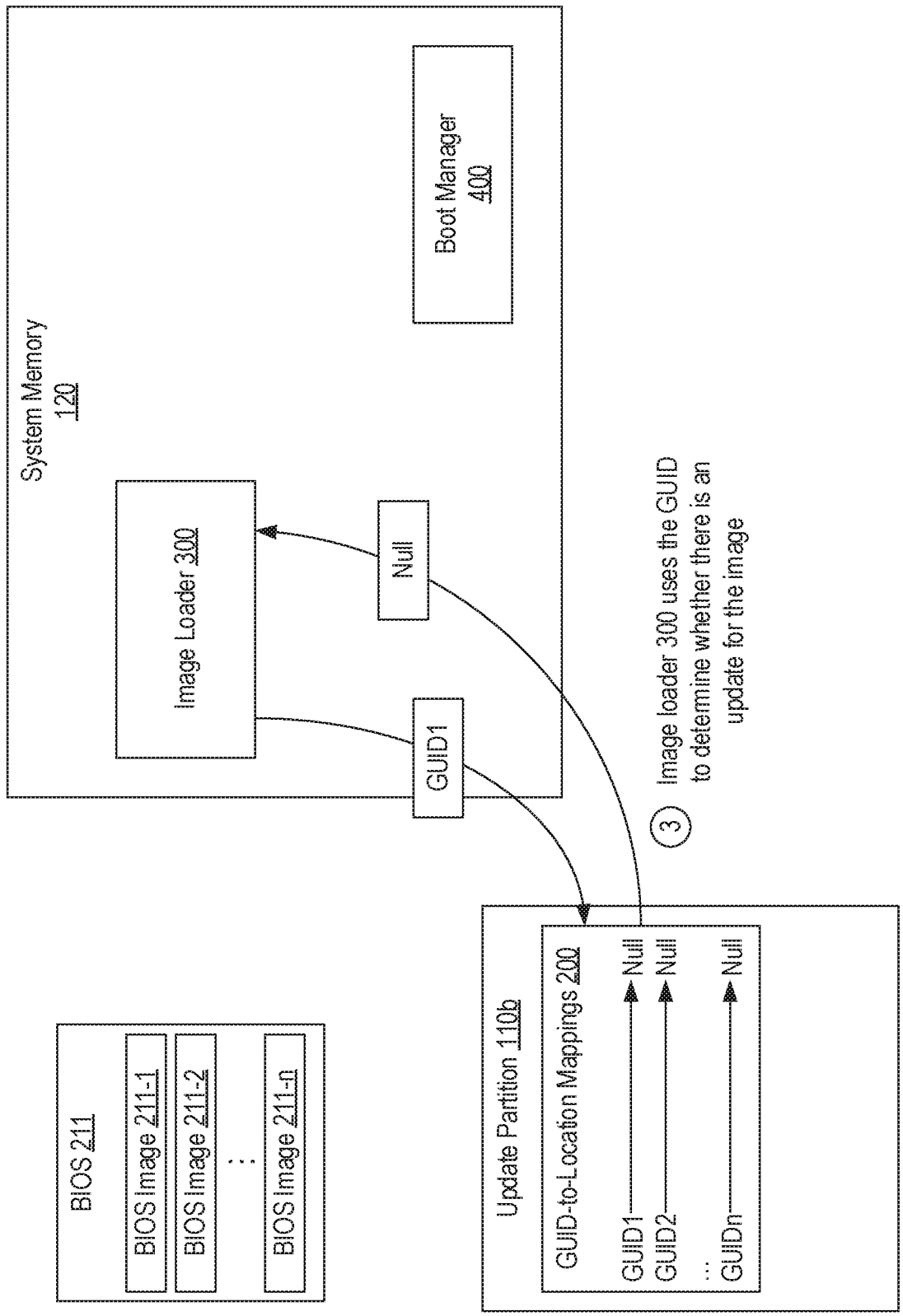
Figure 4C:
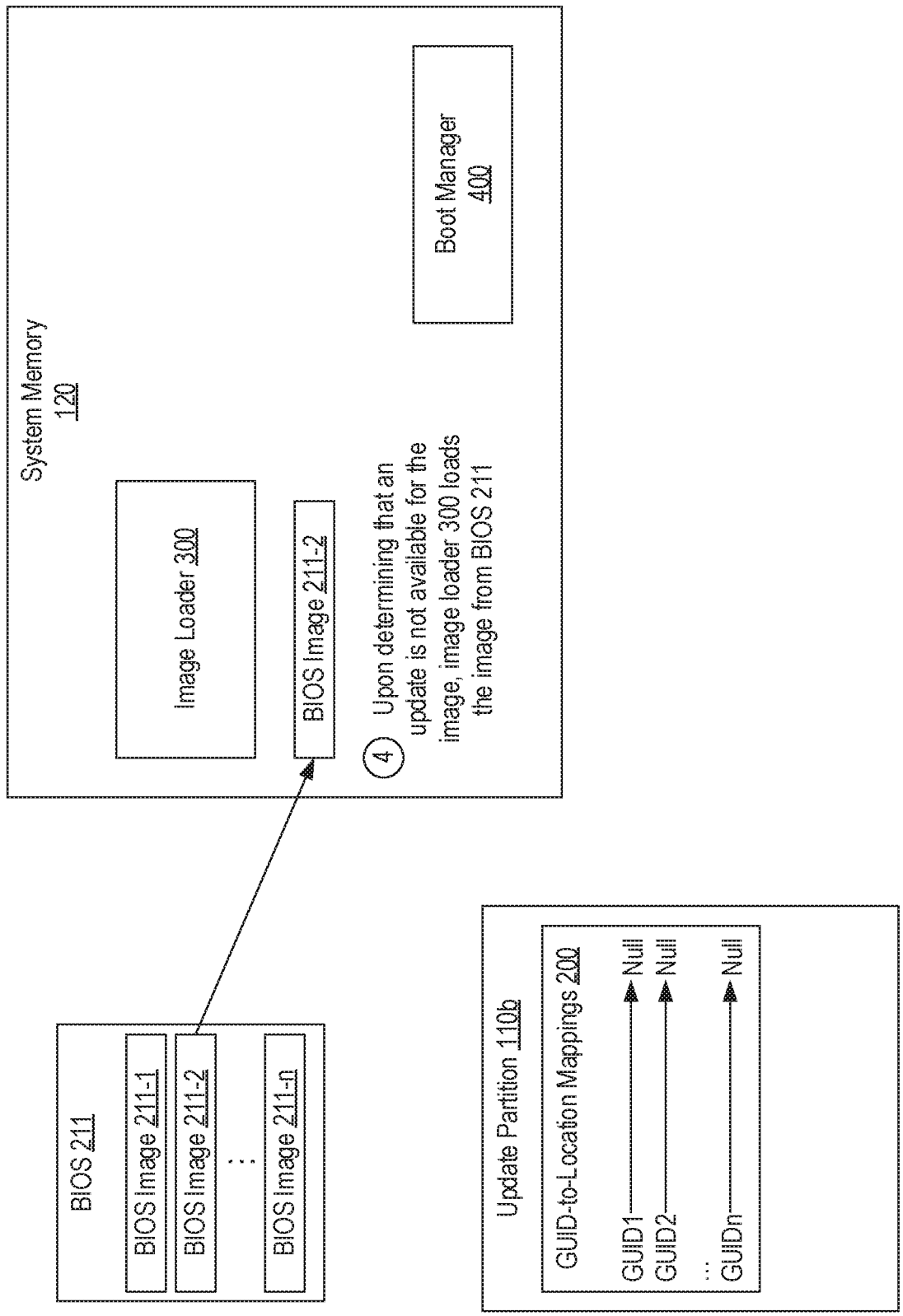

FIGS. 4A-4C provide an example of how image loader 300 can handle a request to load a BIOS image. In these figures, it is assumed that computing system 100 has commenced executing BIOS 211 to the point that image loader 300 has been loaded in system memory 120 and is available for loading BIOS images. It is also assumed that a boot manager 400 has been loaded. In step 1 shown in FIG. 4A, boot manager 400 initiates the loading of a BIOS image. For example, boot manager 400 could call LoadImage( ) and identify BIOS image 211-2 as the BIOS image to load. In step 2, image loader 300 can respond to the request to load BIOS image 211-2 by determining whether BIOS image 211-2 includes a selective update capability field 301 and, if so, image loader 300 can read the value of this field. In this example, BIOS 211-2 includes a selective update capability field 301 and therefore, image loader 300 will read "GUID1" as the value defined in BIOS 211-2's selective update capability field 301. It is noted that, if image loader 300 determines that a BIOS image does not include a selective update capability field 301, image loader 300 can proceed to load the BIOS image from BIOS 211 in a typical fashion.

Turning to FIG. 4B, in step 3, image loader 300 can employ the GUID it read from BIOS image 211-2 (GUID1) to determine whether an update for BIOS image 211-2 is available. For example, image loader 300 could access GUID-to-location mappings 200 to determine whether GUID1 is mapped to a particular storage location. In this example, it is assumed that an update has not yet been made available for BIOS 211-2, and therefore, GUID1 is mapped to null (or some other value that does not define a valid storage location). Accordingly, image loader 300 will determine that an update is not available for BIOS image 211-2.

Turning to FIG. 4C, because image loader 300 has determined that an update is not available for BIOS image 211-2, in step 4, image loader 300 can proceed to load BIOS image 211-2 from BIOS 211 into system memory 120. In this context, loading a BIOS image from BIOS 211 is intended to represent that a BIOS image that is part of the existing BIOS on a computing system (e.g., the BIOS that is programmed into the SPI flash) is loaded.

Figure 5:
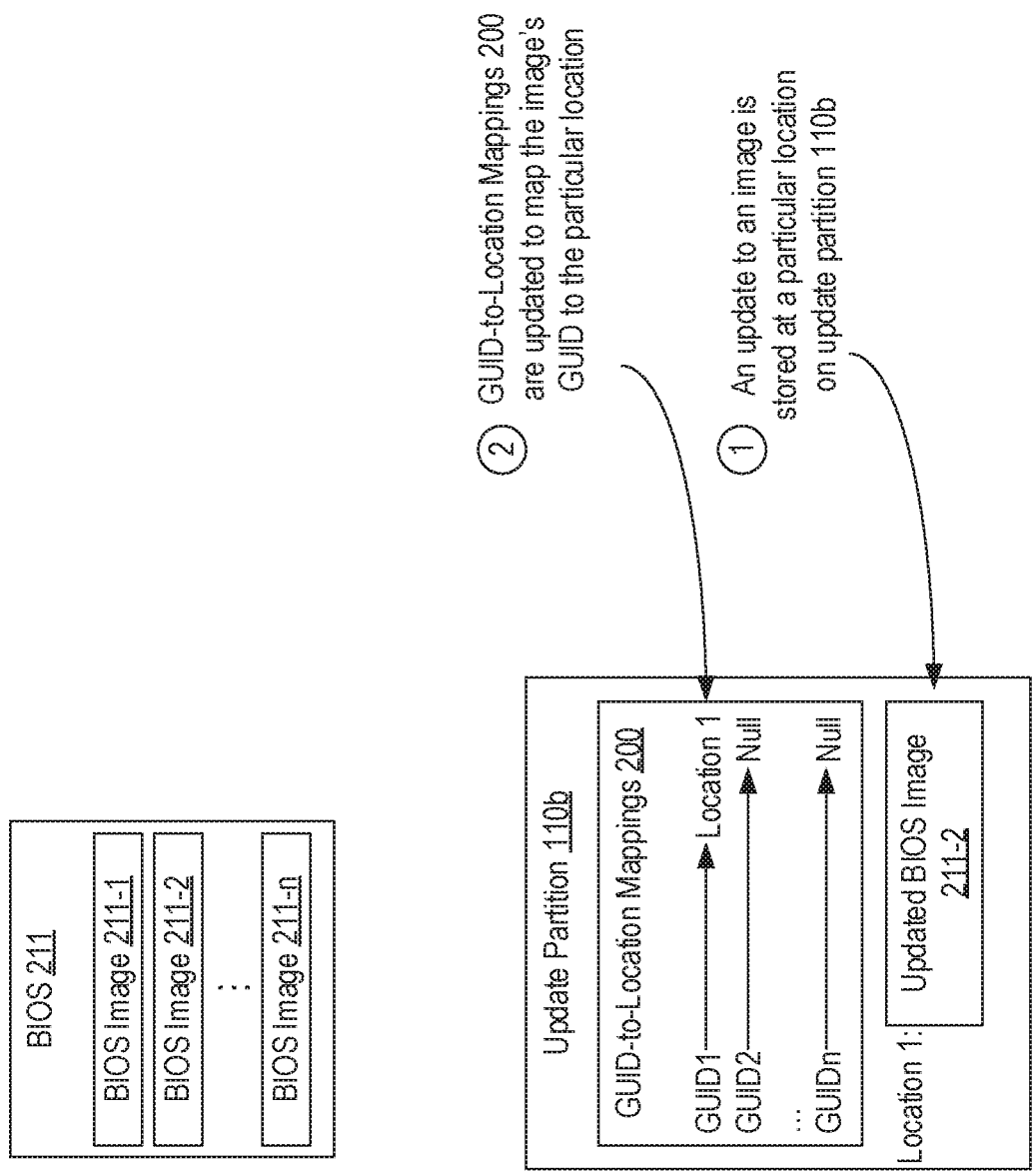
FIG. 5 provides an example of how an updated BIOS image can be deployed on a computing system to enable the updated BIOS image to be loaded in place of an existing BIOS image.

FIG. 5 illustrates how an update to BIOS image 211-2 may be made available on computing system 100 in accordance with embodiments of the present invention. The steps depicted in FIG. 5 are assumed to be performed after those in FIGS. 4A-4C, but similar steps could be performed whenever an update to a BIOS image in BIOS 211 is available. As an example only, a runtime tool (e.g., an update service) executing on computing system 100 could determine that updated BIOS image 211-2 is available (e.g., by querying an update server for available BIOS updates) and retrieve it for deployment. Then, in step 1, the runtime tool could store updated BIOS image 211-2 at a particular location within update partition 110b (or some other storage area that will be accessible to image loader 300 during the boot process). In this example, it is assumed that updated BIOS image 211-2 is stored at location 1. With updated BIOS image 211-2 stored at location 1, in step 2, GUID-to-location mappings 200 could be updated so that GUID1 is mapped to location 1 rather than to null.

Although not shown, updated BIOS image 211-2, like the version of BIOS image 211-2 in BIOS 211 that it is intended to update, could include a selective update capability field 301 that stores GUID1. This value of selective update capability field 301 can be employed to locate the appropriate mapping to update. In particular, when storing updated BIOS image 211-2 at location 1, the GUID defined in updated BIOS image 211-2 could be read so that it will be known that GUID1, and not some other GUID within GUID-to-location mappings 200, should be mapped to location 1.

Figure 6A:
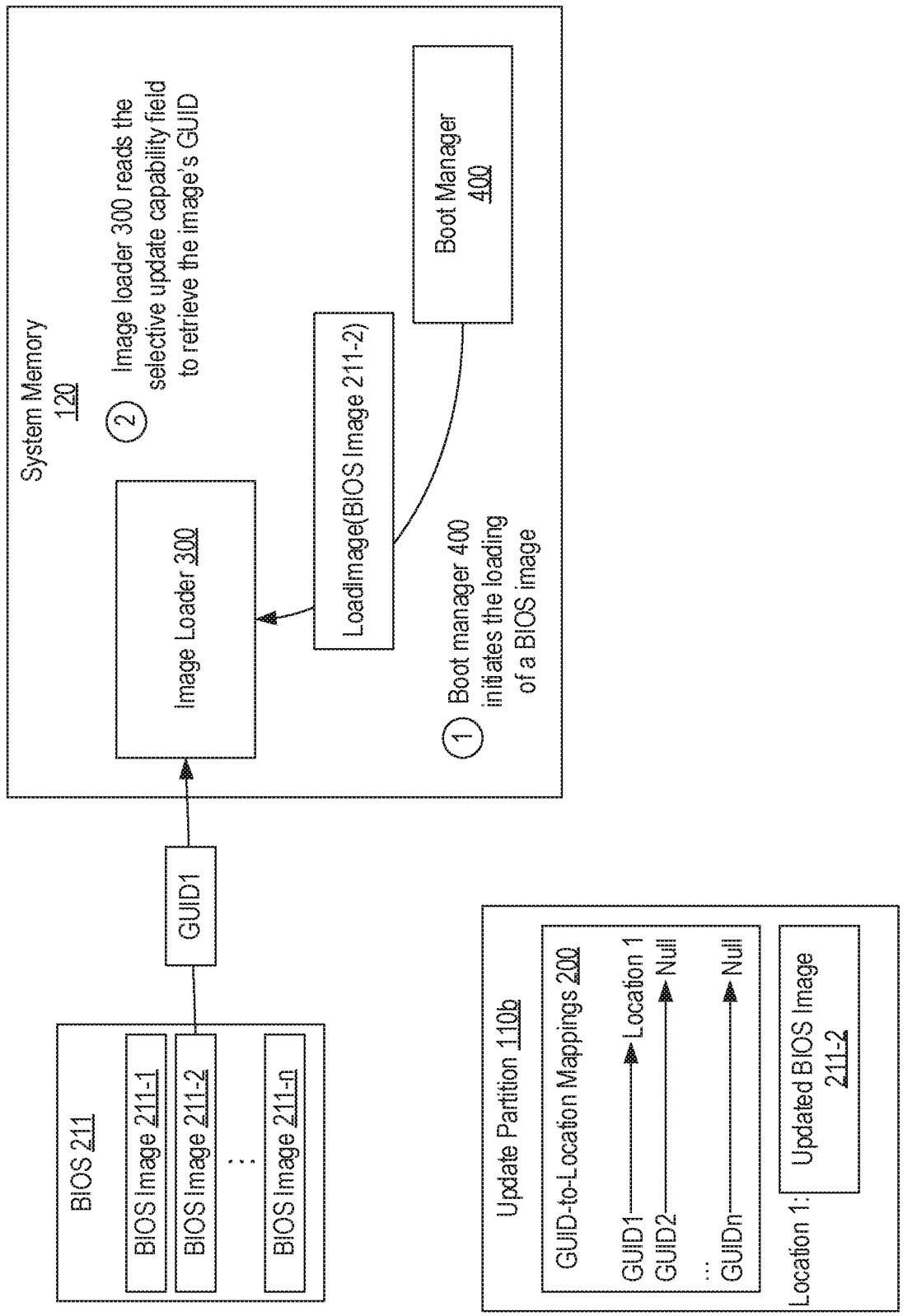
FIGS. 6A-6C provide an example of how an image loader can load an updated BIOS image when it detects that the updated BIOS image is available for a BIOS image that it is attempting to load.
Figure 6B:
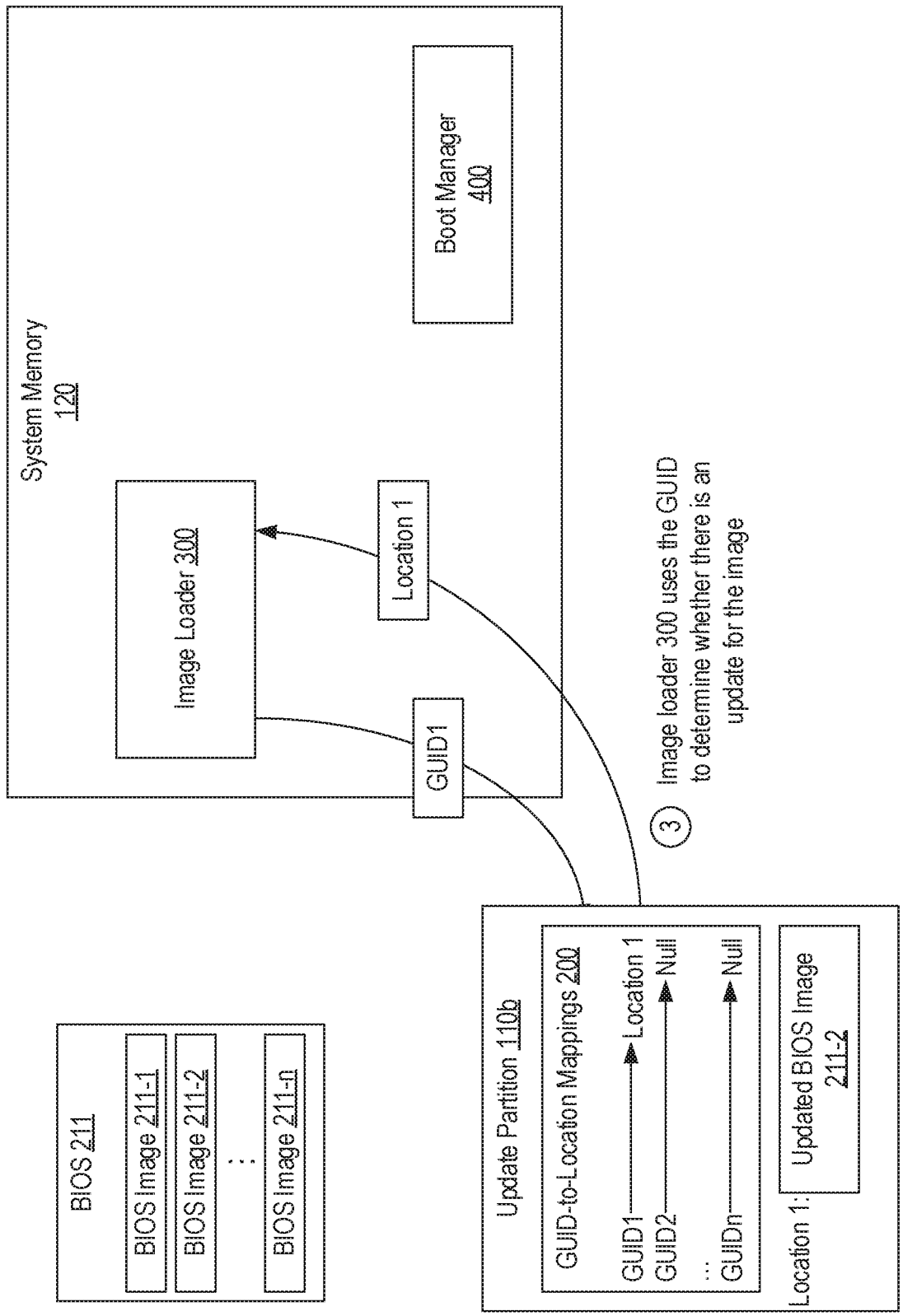
Figure 6C:
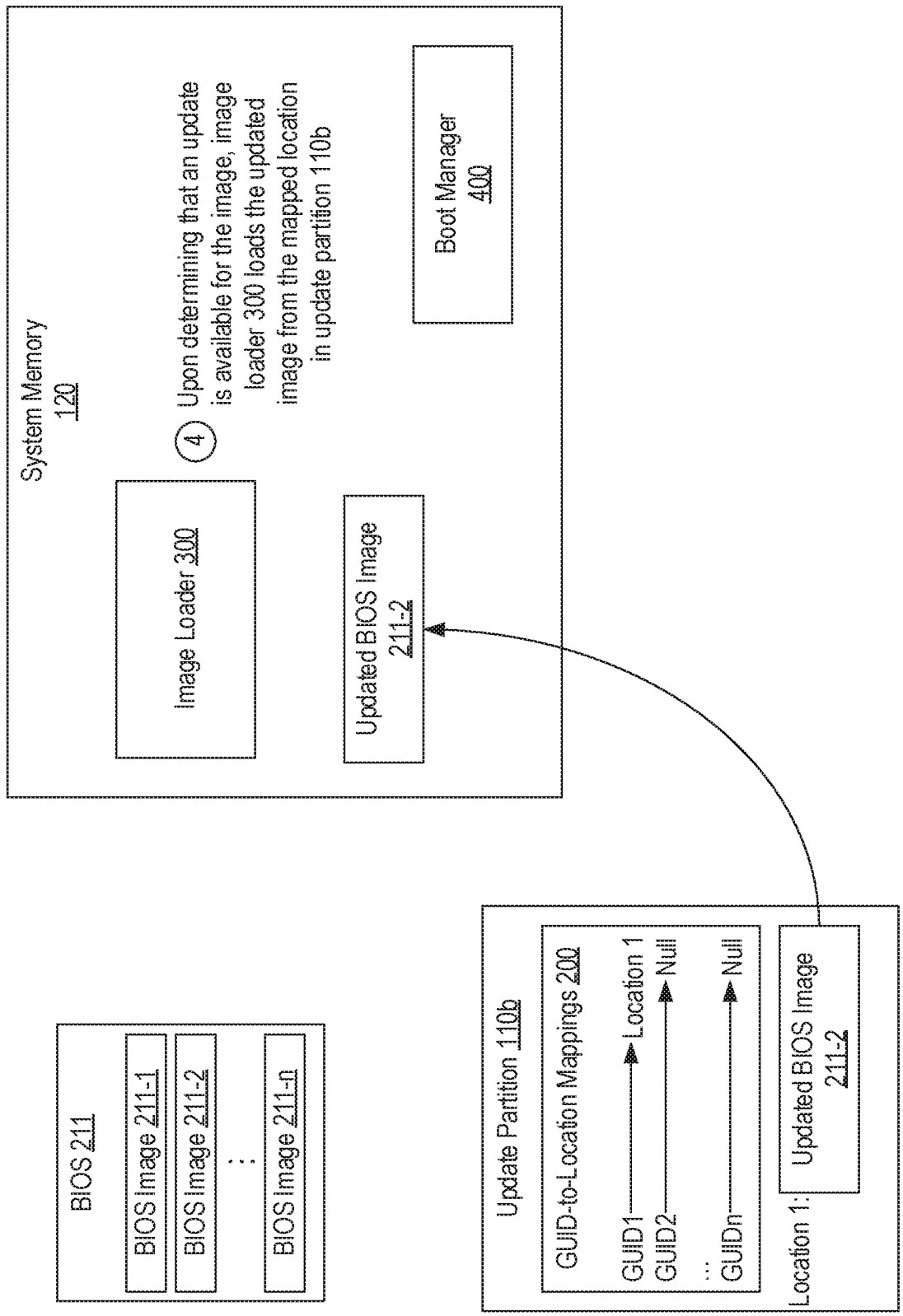

FIGS. 6A-6C provide another example of how image loader 300 can handle a request to load a BIOS image. In this example, it is assumed that the request to load the BIOS image is received after the steps of FIG. 5 have been performed. FIG. 6A illustrates steps 1 and 2 which are the same as steps 1 and 2 of FIG. 4A. In particular, it is again assumed that boot manager 400 has requested that BIOS image 211-2 be loaded which has caused image loader 300 to read GUID1 from selective update capability field 301 contained in BIOS image loader 211-2 which is part of the existing BIOS 211.

FIG. 6B illustrates a step 3 which is similar to step 3 of FIG. 4B. However, in this case, image loader 300's query will retrieve location 1 to which GUID1 is now mapped in GUID-to-location mappings 200. Turning to FIG. 6C, because GUID-to-location mappings 200 maps GUID1 to a particular (valid) location, image loader 300 will determine that an update exists for BIOS image 211-2. Accordingly, in step 4, image loader 300 can employ the mapped location retrieved from GUID-to-location mappings 200 to access and load updated BIOS image 211-2 into system memory 120. Notably, the now old version of BIOS image 211-2 that still exists in BIOS 211 will not be loaded.

As can be seen, the above-described process allows an individual BIOS image to be updated without modifying the existing BIOS on a computing system. For example, with reference to FIG. 6C, updated BIOS image 211-2 is loaded during the boot process while BIOS 211, including BIOS image 211-2, remains unchanged on SPI flash 110. This process can be performed each time computing system 100 is booted to ensure that updated BIOS image 211-2 will be loaded.

This process can also performed in compliance with Secure Boot (or a similar security standard). In particular, any updated BIOS image that is loaded in accordance with the techniques of the present invention can be signed in accordance with the Secure Boot standard. Then, when image loader 300 identifies the available updated BIOS image, it can verify that the updated BIOS image is properly signed before loading it.

In some embodiments, image loader 300 may be configured to access a configuration policy prior to implementing the above-described techniques. For example, a configuration policy may be maintained on computing system and can define whether the selective update of BIOS images should be allowed. In such cases, as part of being executed, image loader 300 can access the configuration policy to determine whether it should perform the selective update process during the boot process. In some embodiments, the configuration policy may identify individual BIOS images, categories of BIOS images or some other grouping of BIOS images for which the selective update process should be performed.

In summary, embodiments of the present invention provide techniques for enabling individual BIOS images to be updated without updating the entire existing BIOS on a computing system while still ensuring compliance with Secure Boot. These techniques allow BIOS updates to be performed with virtually no downtime.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed during a boot process on a computing system, for selectively updating a BIOS image, the method comprising:
   during a first boot process and in response to a request to load a BIOS image from existing BIOS, obtaining a globally unique identifier (GUID) from the BIOS image;
   during the first boot process, accessing GUID-to-location mappings to determine whether the GUID is mapped to a storage location;
   during the first boot process and upon determining from the GUID-to-location mappings that the GUID is not mapped to a storage location;
   after the first boot process, storing an updated BIOS image in a first storage location, the updated BIOS image including the GUID;
   updating the GUID-to-location mappings to map the GUID to the first storage location,
   during a second boot process subsequent to the first boot process and in response to a request to load the BIOS image from existing BIOS, obtaining the GUID from the BIOS image;
   during the second boot process, accessing the GUID-to-location mappings to determine whether the GUID is mapped to a storage location, and
   during the second boot process and upon determining from the GUID-to-location mappings that the GUID is mapped to the first storage location loading the updated BIOS image rather than the BIOS image.

2. The method of claim 1, wherein obtaining the GUID from the BIOS image comprises detecting that the BIOS image includes a selective update capability field and reading the GUID from the selective update capability field.

3. The method of claim 1, wherein loading the updated BIOS image comprises loading the updated BIOS image from the first storage location.

4. The method of claim 1, further comprising:
   prior to loading the updated BIOS image, verifying a signature of the updated BIOS image.

5. The method of claim 1, further comprising:
   during the second boot process and in response to a request to load a second BIOS image from the existing BIOS, obtaining a second GUID from the second BIOS image;
   during the second boot process, employing the second GUID to determine whether an updated BIOS image is available for the second BIOS image; and
   during the second boot process and upon determining that an updated BIOS image is not available for the second BIOS image, loading the second BIOS image from the existing BIOS as part of the second boot process.

6. The method of claim 5, wherein determining that an updated BIOS image is not available for the second BIOS image comprises determining that the second GUID is not mapped to a storage in the GUID-to-location mappings.

7. The method of claim 1, further comprising:
   in response to a request to load a second BIOS image from the existing BIOS, determining that the second BIOS image does not include the selective update capability field; and
   in response to determining that the second BIOS image does not include a selective update capability field, loading the second BIOS image from the existing BIOS.

8. The method of claim 1, wherein the GUID-to-location mappings are maintained in an update partition.

9. The method of claim 8, wherein the first storage location is in the update partition.

10. One or more computer storage media storing computer executable instructions which when executed implement a method for selectively updating a BIOS image during a boot process on a computing system, the method comprising:
    during a first boot process and in response to a request to load a BIOS image from existing BIOS, determining that the BIOS image includes a selective update capability field;
    during the first boot process, employing a globally unique identifier (GUID) defined in the selective update capability field to determine whether an updated BIOS image is available for the BIOS image by accessing GUID-to-location mappings to determine whether the GUID is mapped to a storage location;
    during the first boot process and upon determining that an updated BIOS image is not available for the BIOS image, loading the BIOS image;
    after the first boot process, storing an updated BIOS image in a first storage location, the updated BIOS image including the GUID;
    updating the GUID-to-location mappings to map the GUID to the first storage location;
    during a second boot process and in response to a request to load the BIOS image from existing BIOS, determining that the BIOS image includes the selective update capability field;
    during the second boot process, employing the GUID defined in the selective update capability field to determine whether an updated BIOS image is available for the BIOS image by accessing the GUID-to-location mappings to determine whether the GUID is mapped to a storage location,
    during the second boot process, determining that the GUID is mapped to the first storage location in the GUID-to-location mappings; and
    during the second boot process, loading the updated BIOS rather than the BIOS image.

11. The computer storage media of claim 10, wherein loading the updated BIOS image comprises loading the updated BIOS image from the first storage location.

12. The computer storage media of claim 10, wherein the method further comprises:
    prior to loading the updated BIOS image, verifying a signature of the updated BIOS image.

13. The computer storage media of claim 10, wherein the GUID-to-location mappings are maintained in an update partition.

14. The computer storage media of claim 13, wherein the first storage location is in the update partition.

15. A computing system comprising:
    one or more processors; and computer storage media storing existing BIOS, wherein the existing BIOS implements an image loader and includes a plurality of BIOS images;

wherein the image loader is configured to implement a method during a boot process for selectively updating BIOS images included in the existing BIOS, the method comprising:

during a first boot process and in response to a request to load a first BIOS image from the existing BIOS, obtaining a globally unique identifier (GUID) from the first BIOS image;

during the first boot process, accessing GUID-to-location mappings to determine whether the GUID is mapped to a storage location;

during the first boot process and upon determining from the GUID-to-location mappings that the GUID is not mapped to a storage location, loading the first BIOS image;

after the first boot process, storing an updated first BIOS image in a first storage location, the updated first BIOS image including the GUID;

updating the GUID-to-location mappings to map the GUID to the first storage location;

during a second boot process subsequent to the first boot process and in response to a request to load the first BIOS image from the existing BIOS, obtaining the GUID from the BIOS image, during the second boot process, accessing the GUID-to-location mappings to determine whether the GUID is mapped to a storage location; and during the second boot process and upon determining from the GUID-to-location mappings that the GUID is mapped to the first storage location, loading the updated first BIOS image rather than the first BIOS image.

16. The computing system of claim 15, wherein the method further comprises:

in response to a request to load a second BIOS image included in the existing BIOS, determining that the second BIOS image includes a selective update capability field;

obtaining a second identifier defined in the selective update capability field of the second BIOS image;

determining that the second identifier is not mapped to a storage location; and loading the second BIOS image from the existing BIOS.

17. The computing system of claim 16, wherein the method further comprises:

in response to a subsequent request to load the second BIOS image included in the existing BIOS, determining that the second identifier is mapped to a second storage location; and loading an updated second BIOS image from the second storage location rather than loading the second BIOS image from the existing BIOS.

18. The computing system of claim 15, wherein the method further comprises:

loading the updated first BIOS image after verifying a signature of the updated first BIOS image.

19. The computing system of claim 15, wherein the GUID-to-location mappings are maintained in an update partition.

20. The computing system of claim 19, wherein the first storage location is in the update partition.

* * * * *